Nov. 8, 1960   A. R. BETTENCOURT ET AL   2,959,313
FORK LIFT STACKER
Filed Aug. 1, 1957   3 Sheets-Sheet 3
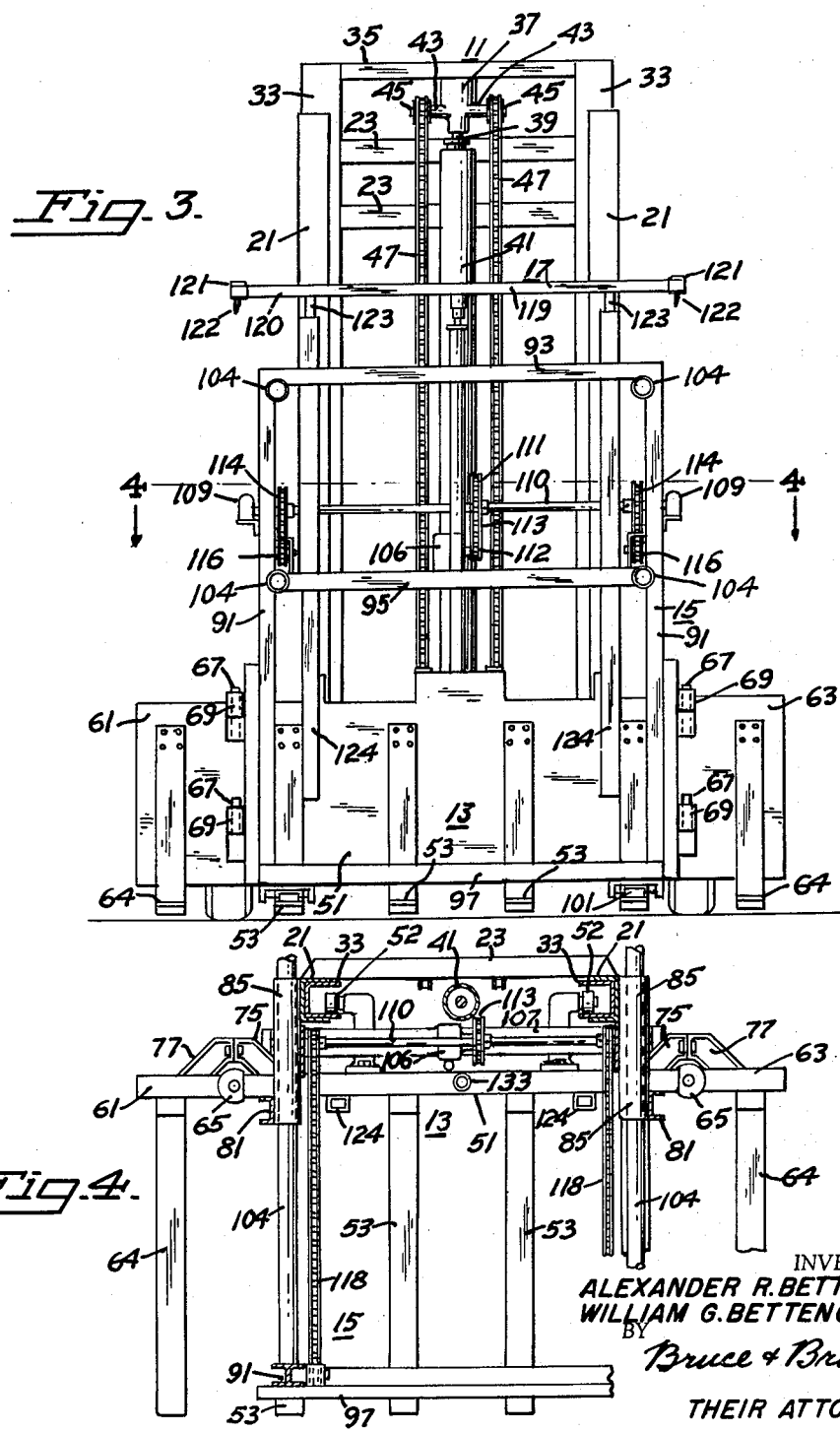
INVENTORS
ALEXANDER R. BETTENCOURT
WILLIAM G. BETTENCOURT, JR.
BY
Bruce & Brosler
THEIR ATTORNEYS United States Patent Office 2,959,313
Patented Nov. 8, 1960

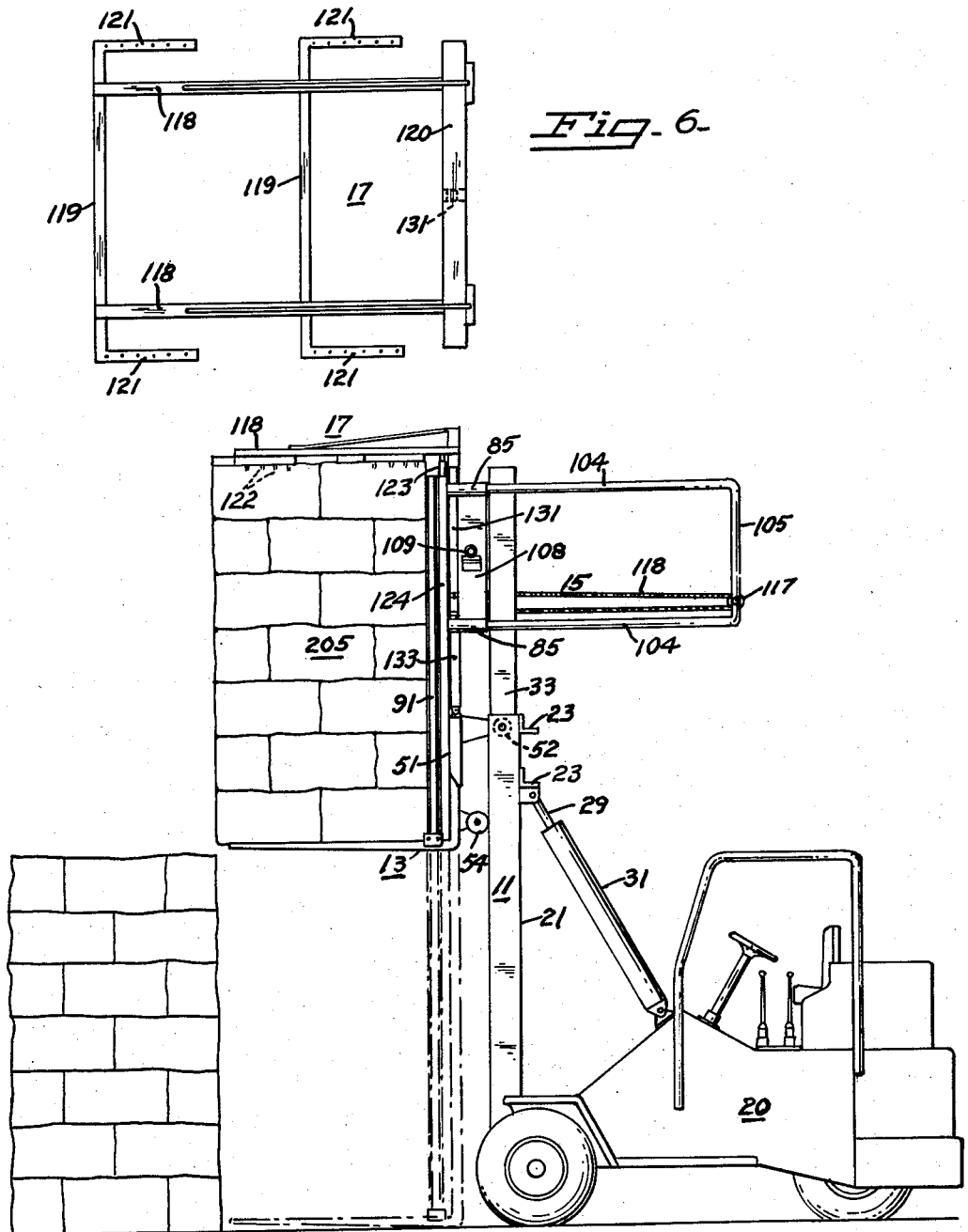

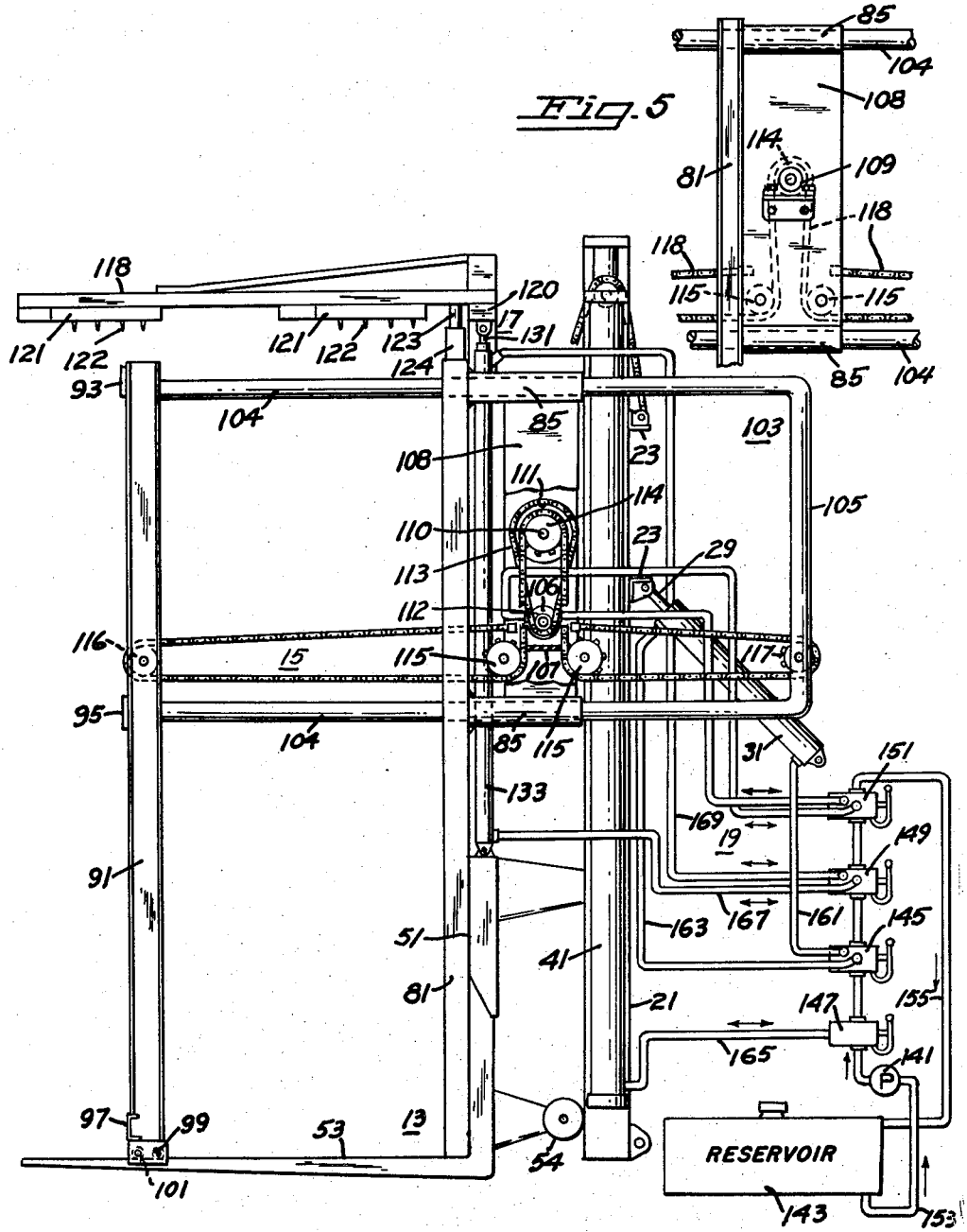

2,959,313

FORK LIFT STACKER

Alexander R. Bettencourt and William G. Bettencourt, Pacific Grove, Calif.; said William G. Bettencourt, assignor to Raymond B. Bentley, Pacific Grove, Calif.

Filed Aug. 1, 1957, Ser. No. 675,715

6 Claims. (Cl. 214—731)

This invention relates to the art of transporting and stacking items and more particularly to the transporting and stacking of such items as baled hay or the like.

Previously, it has been the practice to either employ a derrick, or load the bales on pallets whereby a conventional fork lift might be employed in moving and stacking them. The former usually handles but one bale at a time and is accordingly slow and costly in labor. The latter procedure not only involves considerable labor, but on top of this, one encounters substantial costs and expense in the purchase, maintenance and shipping of the pallets.

Among the objects of the present invention are:

(1) To provide a novel and improved means for the transporting and stacking of baled material such as hay, which means will eliminate a good portion of the costs and expenses of prior practice;

(2) To provide novel and improved transporting and stacking apparatus for baled material in the use of which apparatus, pallets shall not be required.

The invention both as to its organization and its method of operation, together with additional objects and advantages, will be understood from the following description of a specific embodiment, when read in connection with the accompanying drawings, in which:

Fig. 1 is a view, in side elevation, of apparatus incorporating the present invention and illustrating the same in the process of unloading a stack of bales atop a previously unloaded stack;

Fig. 2 is a view in side elevation partly broken away, of the pertinent portion of the apparatus of Fig. 1, in greater detail and including the associated hydraulic system;

Fig. 3 is a view in front elevation of the apparatus shown in Fig. 1;

Fig. 4 is a view in section taken in the plane 4—4 of Fig. 3;

Fig. 5 is a fragmental view depicting, in elevation, the broken away portion of Fig. 2; and Fig. 6 is a view in plan showing the construction of a clamping frame involved in the present invention.

In general, the apparatus of the present invention is a stacker of the fork lift type, so constructed that it may be employed in lifting bales of hay or the like for stacking, without resorting to the use of derricks, pallets or equivalent auxiliary means. For details of such apparatus in its preferred form, reference will be had to the drawings.

The apparatus shown includes a supporting assembly 11, a fork assembly 13, a pusher assembly 15, a load clamping assembly 17, and a control system 19 for moving the components of the apparatus. This apparatus is mounted on a vehicle 20 such as a truck for example.

The supporting unit 11 includes an outer tower or frame consisting of a pair of upright columns 21 of generally C-section joined and braced near their upper end by cross brackets 23. The outer tower is pivotally supported at its lower end to the lower front end of the truck which allows for tilting movement thereof, which is accomplished by a rod 29 hingedly secured to the center of the lower bracket 23, the rod 29 being connected to a piston actuable from within a tilting cylinder 31.

The supporting unit 11 also includes an inner tower consisting of a pair of vertical members 33 of C-section joined by a cross member 35 and slidably disposed within the C-section columns 21. A boss 37 projects downwardly from the center of the cross member 35 and is coupled to the upper end of a piston rod 39 which is connected with the piston of the main hoist cylinder 41. The boss 37 is provided with stud bearings 43 on which sheaves or sprocket wheels 45 are rotatably mounted. Each of the sprocket wheels 45 is draped by a chain 47 which is anchored, one end to the lower of the two cross brackets 23 of the outer tower, and at the other end to the fork assembly 13.

The fork assembly 13 includes a vertical face plate 51 to which a plurality of tines 53 are attached and extend horizontally in load engaging position. The face plate is suspended from the inner tower 33—35 by the chains 47 and has upper bearing rollers 53 (Figure 4) which ride within the columns 33 of the inner tower and lower bearing rollers 54 (Figure 2) which ride against the vertical members 21 of the outer tower.

The foregoing construction is more or less conventional in fork lift apparatus, except that in conventional apparatus the number of tines is usually fixed at two such elements and these are laterally adjustable to accommodate them to pallets of different spacings.

In the present instance, a sufficient number of the tines 53 are preferably provided, which will result in a spacing between successive tines of less than the width of a component of the load, in this case, the width of a bale. With a face plate of conventional size, four tines will provide the proper spacing for hay bales, though the volume capacity of the conventional fork assembly leaves something to be desired in handling large numbers of such items as bales of hay.

To enlarge the volume capacity of the fork assembly within its weight lifting capacity, we add a pair of wing plates 61 and 63, each of which carries a tine 64, and is preferably suspended from an end of the face plate 51 by a hinge 65.

Each hinge may be of the type including a pair of vertically spaced hinge pins 67 supported on an edge of the face plate and adapted to receive aligned vertically spaced sleeves 69 located on the edge of the proximate wing. This type of hinge permits lifting of each wing sufficient to swing it inwardly to approximately a right angle position and cause its tine 64 to settle down and rest across the others. Thus when travelling on a highway, the width of the fork assembly may be brought within limitations permitted by law.

With the wing plates 63 in extended position, their tines 64 are in load engaging position along with the tines 53 of the face plate 51. To secure each wing plate in such extended position, cooperating knee-irons or brackets 75 and 77 are provided respectively on the rear of the face plate and on the rear of the wing plate. These may be bolted together to secure the wing plate firmly with its tine 64 in load engaging position.

The pusher assembly 15 is mounted on and supported by the fork assembly 13. Its support includes a pair of vertical structural members 81, each welded to the face plate adjacent an end thereof, and at vertically spaced locations on each, is affixed, as by welding, a horizontal sleeve guide bearing 85. These serve as guides in the operation of the pusher assembly which includes a pusher frame made up of a pair of vertical legs 91 joined at vertically spaced points by cross strips 93, 95 and 97. At each lower corner of the pusher frame, is welded a saddle 99 straddling an end tine 53 and carrying one or more bearing rollers 101 in engagement with such tine. These permit movement of the pusher frame along these end tines which serve as tracks for the bearing rollers.

The pusher frame is maintained in vertical position by a pair of actuating frames 103, each of which is of generally U-shape and including a pair of horizontal tubular arms 104 joined by an end cross arm 105, the horizontal arms 104 of each frame slidably passing through the vertically spaced guide bearings 85 and joining at their extremities to the pusher frame.

Motivating power is applied to the pusher frame assembly by means of a chain drive from a hydraulic motor 106 supported on a platform 107 which extends between and is welded to a pair of side panels 108, disposed between and welded to the vertically spaced sleeve bearings 85.

Above the hydraulic motor 106 and journalled in end bearings 109 supported on the outer side of the panels 108, is a shaft 110. This shaft carries a driven sprocket 111 in line with a drive sprocket 112 on the motor, thus enabling the two sprockets to be connected by a chain 113 for rotation of the shaft.

Toward each end of the shaft is a sprocket 114, while below each of said sprockets 114, and mounted on the adjacent panel are a pair of idler sprockets 115. At approximately the same elevation on both the pusher frame legs 91 and the pusher frame member 105 are rotatably supported similar sprockets 116 and 117 respectively.

At each side of the pusher frame assembly, a chain 118 is draped over the shaft sprocket 114. One end is then fed under an idler pulley 115, over a pusher frame pulley 116 and anchored to the associated panel 108. Likewise, the other end is drawn under the remaining idler sprocket 115, over the sprocket 117 and then anchored to the panel 108. Depending upon the direction of rotation of the motor 106, the pusher frame may thus be caused to travel forward or in reverse.

The clamping assembly 17 includes a frame made up of a plurality of strips 118 secured together by underneath cross pieces 119 and a base cross piece 120. From these cross pieces extend arms 121 provided with a plurality of downwardly directed load engaging pins 122.

The clamping frame is carried by a pair of vertical slider tubes or rods 123 connected to the strips 118 adjacent the base cross piece 120 and slidably supported in vertical tubes 124 welded to and extending upwardly from the face plate 51. The frame may be suitably braced to impart the desired rigidity to the same.

The clamping frame is movable upwardly and downwardly by a piston rod 131 hingedly secured to the center of cross piece 120 and operating under control of a double acting piston in a cylinder 133, the cylinder being hingedly secured to the upper edge of the face plate 51 for vertical movement therewith.

All functioning assemblies are hydraulically supplied with power from a common pump 141 and reservoir 143, and selective manually actuable valves 145, 147, 149 and 151, all of which are conventional valves and not peculiar to the present invention. The pump may be driven from the engine of the vehicle 20, and is connected with the reservoir 141 through a supply pipe 153. A return pipe 155 serves to complete the hydraulic circuit through each of the functioning assemblies.

The valve 145 is included in the circuit which powers the tilt cylinder and provides for a hose connection 161 to one end of the tilt cylinder and a similar connection 163 to the other end whereby a positive drive may be effected to the tilt mechanism, in either the forward or reverse direction. The valve therefore, has three positions, namely, a forward, a reverse, and a neutral position in which the fluid will by-pass the tilt cylinder.

Valve 147 controls supply of hydraulic fluid to the lower end of the load cylinder 41 for load lifting purposes, and requires but one hose connection 165, since lowering of a load in a fork lift is due to gravity. For lowering of a load, the valve is shifted to connect the hose 165 to the return line. An intermediate or blocking adjustment of the valve will hold the load at any given elevation.

Valve 149 is associated with the vertical adjustment of the clamping frame, and like with the tilt cylinder, provides positive drive through either end of the cylinder 133 through hose connections 167 and 169. In an intermediate or neutral position, the valve by-passes the cylinder 133 and connects the supply to the next valve 151 and return connection.

Valve 151 controls power to the hydraulic motor 106 for the pusher frame assembly and is similar to valve 145 and 149 in providing for reversing the flow of liquid in the associated circuit. In neutral position, the valve by-passes the motor and connects the liquid supply to the return line.

In the standby or ready-for-use condition of the fork lift stacker of the present invention, valves 145, 149 and 151 are set in neutral position and 147 in its downward position. The fork assembly 13 is in the lowermost position. The hydraulic motor 89 is at rest with the pusher frame preferably in its retracted position and the clamping frame in elevated position.

Let it now be assumed that a stack of bales 205 of hay or the like is to be removed from a truck for example, and stacked. The stacker is moved to position adjacent the truck and with the wings 61 and 63 extended and locked, the valve 147 controlling the main lift cylinder 41 is manipulated to raise the fork to the level of the truck bed, following which the fork is driven beneath the pile of bales to be removed and stacked.

Through manipulation of the valve 149 the clamping frame is lowered into clamping engagement with the pile to stabilize the same on the fork. The stacker is then backed away from the truck and driven to the place of unloading. With the fork adjusted to proper elevation and disposed over the placement area, the clamping frame is lifted out of engagement with the bales and the pusher frame then urged forward simultaneously with reverse movement of the stacker, which effects a slow withdrawal of the tines while the pile of bales is being unloaded therefrom.

The apparatus disclosed herein is a fork lift stacker which operates directly on a load such as a stack of bales of hay to move the stack from one position to the other. By reason of the cooperation of the fork, the pusher frame and the clamping frame, a large number of bales may be handled at one time. Pallets are not necessary, and the high labor cost and expense of using pallets is thus avoided.

Also, while the apparatus has been developed particularly for the stacking of hay bales, it may be employed in stacking any type of goods or material so long as the tines may be conveniently driven into or beneath a stack or pile of such items.

While a preferred embodiment of the invention has been disclosed herein, many modifications thereof are feasible. This invention therefore is not to be restricted except insofar as is necessitated by the appended claims.

We claim:

1. In a fork-lift stacker, a fork assembly including a face plate, a plurality of tines, means mounting said tines on said face plate to provide a tine supporting area, and means for enlarging the tine supporting area of said fork assembly, said means including a face plate wing section for each end of said face plate, said wing section having at least one tine extending therefrom and adapted to lie in the plane of said other tines when said wing is disposed in the plane of said face plate, and means securing each said wing section to its end of said face plate.

2. In a fork-lift stacker, a fork assembly including a face plate, a plurality of tines, means mounting said tines on said face plate so that said tines extend horizontally therefrom to provide a tine supporting area, and means for enlarging the tine supporting area of said fork assembly, said means including a face plate wing section for each end of said face plate, said wing section having at least one tine extending therefrom and adapted to lie in the plane of said other tines when said wing section is disposed in the plane of said face plate, and means hingedly securing each said wing section to its end of said face plate.

3. In a fork-lift stacker, a fork assembly including a face plate, a plurality of tines, means mounting said tines on said face plate so that said tines extend horizontally from the base of said face plate, and means for extending the volume capacity of said fork assembly, said means including a face plate wing section for each end of said face plate, said wing section having at least one tine extending therefrom and adapted to lie in the plane of said other tines when said wing section is disposed in the plane of said face plate, means hingedly securing each said wing section to its end of said face plate, means for securing each said wing section in the plane of said face plate to function as part of said fork assembly, said hinge securing means being of the pin type to permit forward rotation and simultaneous lifting of each wing section.

4. In a fork-lift stacker for stacking without the aid of pallets, material such as hay bales or the like, a fork assembly including a face plate, a plurality of tines, means mounting said tines on said face plate so that said tines extend horizontally therefrom, the number and spacing of said tines being such as to directly support a stack of such bales having an over-all width comparable to the length of said face plate, and means for extending the volume capacity of said fork assembly, said means including a face plate wing section for each end of said face plate, said wing section having at least one tine extending therefrom and adapted to lie in the plane of said other tines when said wing section is disposed in the plane of said face plate, means hingedly securing each said wing section to its end of said face plate, means for securing each said wing section in the plane of said face plate to function as part of said fork assembly, said means including a pair of knee brackets, one on the rear of said face plate and one on the rear of a wing section, and means for joining said knee brackets, said hinge securing means being of the pin type to permit forward rotation and simultaneous lifting of each wing section.

5. In a fork-lift stacker for stacking without the aid of pallets, material such as hay bales or the like, a fork assembly including a face plate, a plurality of tines, means mounting said tines on said face plate so that said tines extend horizontally from the base of said face plate, the number and spacing of said tines being such as to directly support a stack of such bales having an over-all width comparable to the length of said face plate, and means for extending the volume capacity of said fork assembly, said means including a face plate wing section for each end of said face plate, said wing section having at least one tine extending therefrom and adapted to lie in the plane of said other tines when said wing section is disposed in the plane of said face plate, means hingedly securing each said wing section to its end of said face plate, means for securing each said wing section in the plane of said face plate to function as part of said fork assembly, said means including a pair of knee brackets, one on the rear of said face plate and one on the rear of a wing section, said pair of knee brackets being adapted to abut when said wing section is in the plane of said face plate, and means for joining said knee brackets when in such abutting relationship, said hinge securing means being of the pin type to permit forward rotation and simultaneous lifting of each wing section.

6. A fork-lift stacker comprising in combination, a fork assembly including a plurality of tines extending in load engaging position, a load clamping frame, and means connected to said fork assembly for moving said clamping frame in a direction generally perpendicular to said tines, into and out of engagement with a load, said moving means including a hydraulic cylinder, a piston in said cylinder and connected to said clamping frame, hydraulic fluid supply means, and means connecting said cylinder on both sides of said piston to said supply means, said connecting means including valve means for selectively directing said fluid to either side of said piston whereby said clamping frame may be moved positively into or out of load clamping position.

References Cited in the file of this patent

UNITED STATES PATENTS

| | | |
|---|---|---|
| 2,234,851 | Asper | Mar. 11, 1941 |
| 2,271,624 | Cochran | Feb. 3, 1942 |
| 2,601,932 | Turner | July 1, 1952 |
| 2,647,649 | Maynard | Aug. 4, 1953 |
| 2,678,141 | Wight | May 11, 1954 |
| 2,684,165 | Hill | July 20, 1954 |
| 2,684,773 | Boyles | July 27, 1954 |
| 2,702,131 | Leupke | Feb. 15, 1955 |
| 2,709,018 | Schenkelberger | May 24, 1955 |
| 2,732,087 | Pratt | Jan. 24, 1956 |
| 2,748,965 | Grey | June 5, 1956 |
| 2,785,818 | Mercier et al. | Mar. 19, 1957 |
| 2,799,417 | Morrell | July 16, 1957 |